United States Patent
Paulus et al.

(10) Patent No.: US 10,913,106 B2
(45) Date of Patent: Feb. 9, 2021

(54) CAST-IN FILM COOLING HOLE STRUCTURES

(71) Applicant: United Technologies Corporation, Farmington, CT (US)

(72) Inventors: John Paulus, Afton, VA (US); Dustin W. Davis, Marlborough, CT (US); Joel H. Wagner, Wethersfield, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 151 days.

(21) Appl. No.: 16/131,695

(22) Filed: Sep. 14, 2018

(65) Prior Publication Data

US 2020/0086380 A1  Mar. 19, 2020

(51) Int. Cl.
*B22C 9/10* (2006.01)
*B22C 7/02* (2006.01)
*B22C 9/24* (2006.01)
*B22D 25/02* (2006.01)
*F01D 5/18* (2006.01)

(52) U.S. Cl.
CPC .......... *B22C 9/10* (2013.01); *B22C 7/02* (2013.01); *B22C 9/24* (2013.01); *B22D 25/02* (2013.01); *F01D 5/186* (2013.01); *F05D 2230/211* (2013.01); *F05D 2260/202* (2013.01)

(58) Field of Classification Search
CPC . F01D 5/18; F01D 5/186; F01D 5/187; F01D 5/188; B22C 9/10
See application file for complete search history.

(56) References Cited

U.S. PATENT DOCUMENTS

| | | | | |
|---|---|---|---|---|
| 4,669,957 A | * | 6/1987 | Phillips | F01D 5/186 415/115 |
| 4,684,322 A | * | 8/1987 | Clifford | F01D 5/187 415/175 |
| 6,547,524 B2 | * | 4/2003 | Kohli | F01D 5/141 415/115 |
| 6,644,920 B2 | * | 11/2003 | Beeck | B23H 9/10 204/212 |

(Continued)

FOREIGN PATENT DOCUMENTS

| EP | 1213442 A1 | 6/2002 |
|---|---|---|
| FR | 2990367 A1 | 11/2013 |

OTHER PUBLICATIONS

Extended European Search Report for EP Application No. 19197614.1, dated Oct. 30, 2019, 10 pages.

*Primary Examiner* — Nathaniel E Wiehe
*Assistant Examiner* — Jackson N Gillenwaters
(74) *Attorney, Agent, or Firm* — Kinney & Lange, P.A.

(57) ABSTRACT

A core element of an investment core for use in a casting process used to produce an airfoil includes an investment core body, an extension connected to and protruding from the investment core body, and a connection portion connected to the investment core body and to the extension. The investment core body comprises a ceramic material. A shape of the extension comprises a tube with a centerline axis passing through a center of the extension. A shape of a cross-section of the extension taken along a plane perpendicular to the extension centerline axis comprises an ellipse. The extension is connected to the investment core body by the connection portion.

7 Claims, 10 Drawing Sheets

(56) References Cited

U.S. PATENT DOCUMENTS

| | | | |
|---|---|---|---|
| 6,981,846 B2 * | 1/2006 | Liang | F01D 5/186 |
| | | | 416/97 R |
| 8,382,431 B1 * | 2/2013 | Liang | F01D 5/187 |
| | | | 416/1 |
| 8,678,751 B2 * | 3/2014 | Tibbott | F01D 5/186 |
| | | | 415/115 |
| 8,813,824 B2 | 8/2014 | Appleby et al. | |
| 8,858,176 B1 * | 10/2014 | Liang | F01D 5/186 |
| | | | 416/97 R |
| 9,038,700 B2 | 5/2015 | Dube et al. | |
| 9,138,804 B2 | 9/2015 | Spangler | |
| 9,315,663 B2 | 4/2016 | Appleby et al. | |
| 9,486,854 B2 | 11/2016 | Propheter-Hinckley | |
| 9,555,470 B1 | 1/2017 | Heneveld et al. | |
| 9,878,369 B1 | 1/2018 | Heneveld et al. | |
| 9,995,151 B2 * | 6/2018 | Sezer | F01D 5/189 |
| 2013/0139990 A1 | 6/2013 | Appleby et al. | |
| 2014/0271129 A1 | 9/2014 | Mueller et al. | |
| 2014/0286762 A1 | 9/2014 | Kerber et al. | |
| 2016/0167115 A1 | 6/2016 | Merrill et al. | |
| 2017/0173683 A1 | 6/2017 | Simpson et al. | |

\* cited by examiner

Fig. 5

CAST-IN FILM COOLING HOLE STRUCTURES

BACKGROUND

The present disclosure generally relates to investment casting. In particular, the present disclosure relates to cast-in film cooling hole structures for gas turbine engines.

Gas turbine engines are widely used in aircraft propulsion, electric power generation, and ship propulsion. In all gas turbine engine applications, efficiency is a prime objective. Improved gas turbine engine efficiency can be obtained by operating at higher temperatures, however current operating temperatures are at such a level that, in the turbine section, the superalloy materials used have limited mechanical properties. Consequently, it is a general practice to provide air cooling for components in the hottest portions of gas turbine engines, typically in the turbine section. Cooling is provided by flowing relatively cool air from the compressor section of the engine through passages in the turbine components to be cooled.

Investment casting is a commonly used technique for forming metallic components having complex geometries, especially hollow components, and is used in the fabrication of superalloy gas turbine engine components. Existing casting cores are fabricated from ceramic materials. Such cores are fragile, especially the advanced cores used to fabricate small intricate cooling passages in advanced hardware. Existing cores involve long, thin rods for simulating a machined cylindrical hole. These rods are fragile and are prone to warpage and breaking during fabrication and metal casting.

SUMMARY

A core element of an investment core for use in a casting process used to produce an airfoil includes an investment core body, an extension connected to and protruding from the investment core body, and a connection portion connected to the investment core body and to the extension. The investment core body comprises a ceramic material. A shape of the extension comprises a tube with a centerline axis passing through a center of the extension. A shape of a cross-section of the extension taken along a plane perpendicular to the extension centerline axis comprises an ellipse. The extension is connected to the investment core body by the connection portion.

An airfoil includes a body, an airfoil wall, a cooling circuit, and a cooling hole. The airfoil wall forms an exterior surface of the body. The cooling circuit is disposed within the body. The cooling hole is disposed in a portion of the body. The cooling hole fluidly connects the cooling circuit to the exterior surface of the airfoil wall. The cooling hole includes a cavity, an outlet, and a rod of solid material. The cavity is disposed in a portion of the airfoil wall. The cavity includes a tubular shape with a centerline axis passing through a center of the cavity. A cross-section shape of the cavity taken along a plane perpendicular to the cavity centerline comprises an ellipse. The outlet fluidly connects the cavity to the exterior surface of the body and is disposed in a portion of the exterior surface of the airfoil wall. The rod of solid material is disposed in the cavity and passes through a portion of the cavity.

A core assembly for use with an investment casting process includes a core element and a wax pattern. The core element includes a body, an extension connected to and protruding from the body, a channel disposed through the extension, and a connection portion connected to the body and to the extension. The extension is connected to the body by the connection portion. A shape of the extension includes a tube with a centerline axis passing through a center of the extension. A shape of a cross-section of the extension taken along a plane perpendicular to the extension centerline axis includes an ellipse. The channel includes a centerline axis passing through a center of the channel. A shape of a cross-section of the channel taken along a plane perpendicular to the channel centerline axis includes an ellipse.

A method of cooling an airfoil includes providing cooling air into a cavity of a cooling hole disposed in the airfoil. The airfoil includes a body, an airfoil wall forming an exterior surface of the body, a cooling circuit disposed within the body, and the cooling hole. The cooling hole is disposed in a portion of the body and fluidly connects the cooling circuit to the exterior surface of the airfoil wall. The cooling hole includes the cavity, an outlet, and a rod of solid material. The cavity is disposed in a portion of the airfoil wall. The cavity includes a tubular shape with a centerline axis passing through a center of the cavity. A cross-section shape of the cavity taken along a plane perpendicular to the cavity centerline includes an ellipse. The outlet fluidly connects the cavity to the exterior surface of the body and is disposed in a portion of the exterior surface of the airfoil wall. The rod of solid material is disposed in the cavity and passes through a portion of the cavity.

A method of making an airfoil includes forming a core assembly and creating an airfoil with the core assembly through investment casting. The core assembly includes a core element and a wax pattern. The core element includes a body, an extension connected to and protruding from the body, a channel disposed through the extension, and a connection portion connected to the body and to the extension. The extension is connected to the body by the connection portion. A shape of the extension includes a tube with a centerline axis passing through a center of the extension. A shape of a cross-section of the extension taken along a plane perpendicular to the extension centerline axis includes an ellipse. The channel includes a centerline axis passing through a center of the channel. A shape of a cross-section of the channel taken along a plane perpendicular to the channel centerline axis includes an ellipse. The airfoil includes a body, an airfoil wall, a cooling circuit, and a cooling hole. The airfoil wall forms an exterior surface of the body. The cooling circuit is disposed within the body. The cooling hole is disposed in a portion of the body. The cooling hole fluidly connects the cooling circuit to the exterior surface of the airfoil wall. The cooling hole includes a cavity, an outlet, and a rod of solid material. The cavity is disposed in a portion of the airfoil wall. The cavity includes a tubular shape with a centerline axis passing through a center of the cavity. A cross-section shape of the cavity taken along a plane perpendicular to the cavity centerline comprises an ellipse. The outlet fluidly connects the cavity to the exterior surface of the body and is disposed in a portion of the exterior surface of the airfoil wall. The rod of solid material is disposed in the cavity and passes through a portion of the cavity.

DETAILED DESCRIPTION

Existing ceramic cores can be produced by a molding process using a ceramic slurry and a shaped die; both injection molding and transfer-molding techniques may be employed. The pattern material is most commonly wax although plastics, low melting-point metals, and organic compounds such as urea, have also been employed. The shell mold is formed using a colloidal silica binder to bind together ceramic particles which may be alumina, silica, zirconia, and alumina silicates.

The investment casting process to produce a turbine blade, using a ceramic core, will be explained briefly here (although it is not depicted in any of the figures). A ceramic core having the geometry desired for the internal cooling passages is placed in a metal die whose walls surround but are generally spaced away from the core. The die is filled with a disposable pattern material such as wax. The die is removed leaving the ceramic core embedded in a wax pattern. The outer shell mold is then formed about the wax pattern by dipping the pattern in a ceramic slurry and then applying larger, dry ceramic particles to the slurry. This process is termed stuccoing. The stuccoed wax pattern, containing the core, is then dried and the stuccoing process repeated to provide the desired shell mold wall thickness. At this point the mold is thoroughly dried and heated to an elevated temperature to remove the wax material and strengthen the ceramic material.

The result is a ceramic mold containing a ceramic core which in combination define a mold cavity. It will be understood that the exterior of the core defines the passageway to be formed in the casting and the interior of the shell mold defines the external dimensions of the superalloy casting to be made. The core and shell may also define casting portions such as gates and risers which are necessary for the casting process but are not a part of the finished cast component. After the removal of the wax and thermally sintering the refractory ceramic shell mold, molten superalloy material is poured into the cavity defined by the shell mold and core assembly and solidified. The mold and core are then removed from the superalloy casting by a combination of mechanical and chemical means.

A cast-in circular cooling hole will provide greater stability as a core feature and allow the possibility of cooling tuning performance without making the structure excessively fragile. Structures such as a wheel with a hole, elongations, or other features, along with variances in orientation and placement of the cast circular structure, can be used to direct and tune air flow and are disclosed herein.

Figure 1:
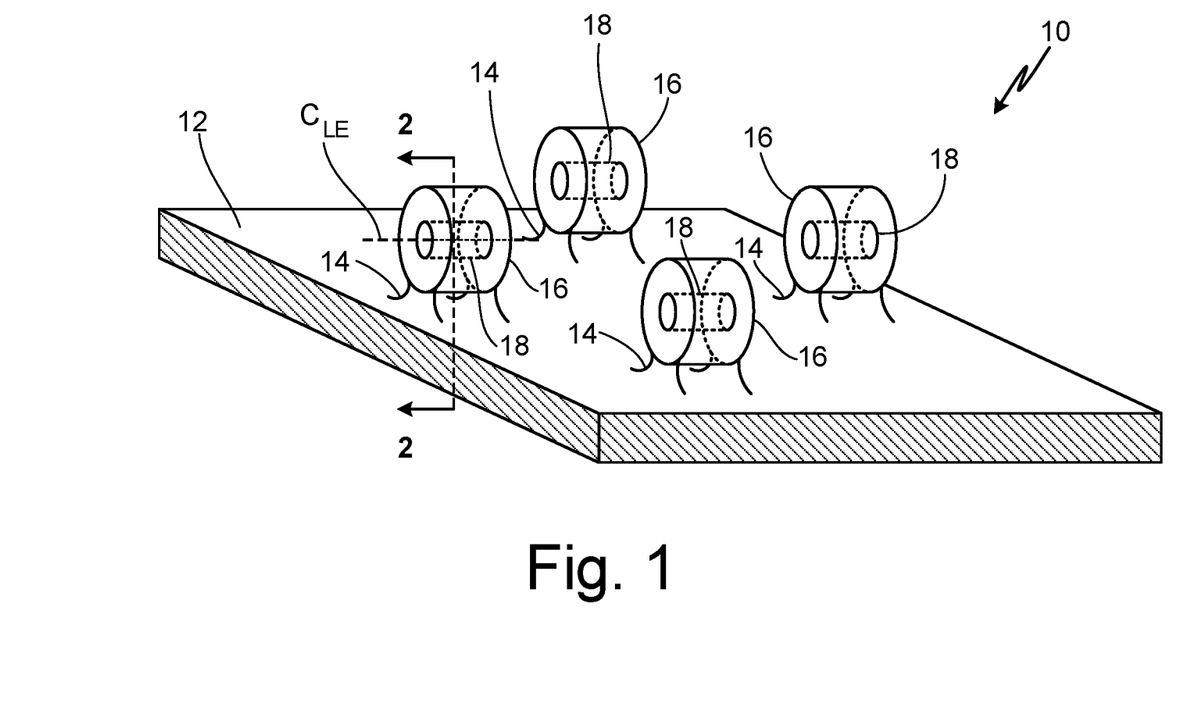
FIG. 1 is a perspective view of a small portion of a core element with four extensions.

FIG. 1 is a perspective view of a portion of core element 10 and shows body 12, connection portions 14, extensions 16, centerline axis $C_{LE}$ of extension 16, and channels 18.

Core element 10 is a small sub-portion of a larger investment core for use in a casting process used to produce an airfoil. Core element 10 can include ceramic and/or refractory metal materials. For example, a material of core element 10 can include silica, alumina, zirconia, chromia, mullite, and hafnia, or other suitable ceramic materials, as well as molybdenum, tantalum, niobium, tungsten, and alloys thereof. Refractory metal alloys and intermetallics such as molybdenum alloys, tungsten alloys, tantalum alloys, niobium alloys, and molybdenum disilicide ($MoSi_2$), respectively, which form protective silicon dioxide ($SiO_2$) layers can also be employed.

Body 12 is a major portion of core element 10 that includes a generally flat, planar shape. Connection portions 14 are intermediary sections of core element 10 positioned between body 12 and extensions 16. Extensions 16 are tubes of casting core material. Extensions 16 can include a cross-section shape of an ellipse, and in this non-limiting example a circle. There can be more or less than the four extensions 16 shown in the embodiment. Channels 18 are cylindrically shaped passages or openings. Centerline axis $C_{LE}$ of extension 16 is an imaginary major axis extending through a center of extension 16 as shown in FIG. 1.

Body 12 is connected to and formed as a single piece of material with connection portions 14 and with extension 16. Connection portions 14 are positioned between and connected to body 12 and extensions 16. Extensions 16 are connected to and formed with connection portions 14. Channels 18 are formed in and pass through a center of each of extensions 16.

Core element 10 is configured as an investment core for use in a casting process used to produce an airfoil. The casting process can be an investment casting or lost wax casting process. Body 12, connection portions 14, and extensions 16 are used as molds in the casting process to form voids or cavities in the final cast part. Channels 18 provide a void in which a piece of wax is positioned. During the casting process, the piece of wax positioned in channels 18 is melted away allowing the casting metal to fill and form into the void left by the wax that was in channels 18. In this way, channels 18 represent a solid cylinder of cast material of the final part.

Configurations of existing cooling hole casting cores include long thin rods to simulate machined cylindrical holes. However, these rods are fragile and prone to breaking during fabrication and metal casting. In contrast, extensions 16 of body 10 provide greater stability as a core feature to prevent breakage of core element 10 during setup and execution of the casting process.

Figure 2A:
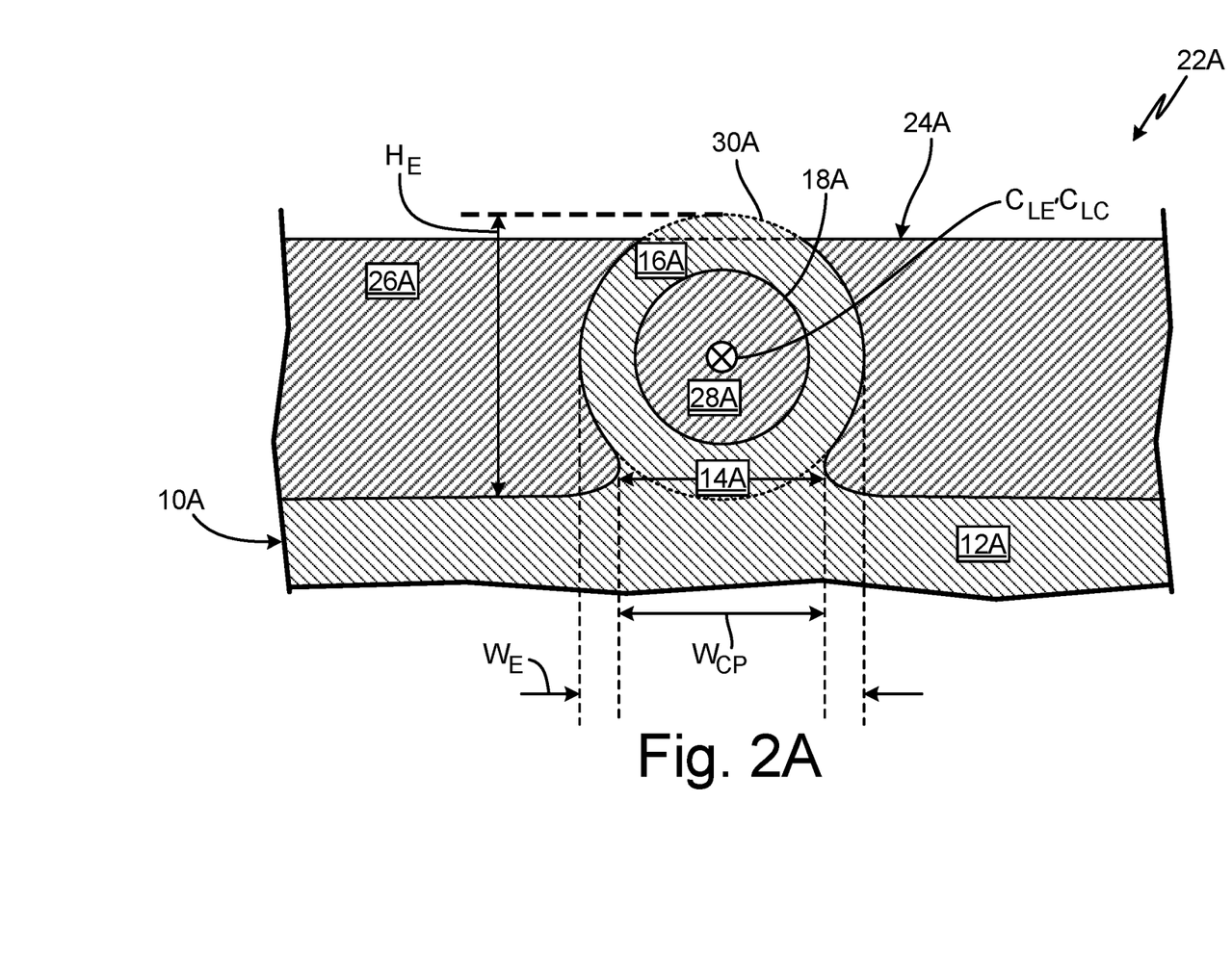
FIG. 2A is a side, cross-section view of a first core element and a first wax pattern taken along 2-2 shown in FIG. 1.

FIG. 2A is a side, cross-section view taken along 2-2 shown in FIG. 1 of core assembly 22A that shows core element 10A (with body 12A, connection portion 14A, extension 16A, centerline axis $C_{LE}$ of extension 16A, channel 18A, and centerline axis $C_{LC}$ of channel 18A) and wax pattern 24A (with first wax piece 26A, second wax piece 28A, and slip area 30A). FIG. 2A also shows height $H_E$ of extension 16A, width $W_E$ of extension 16A, and width $W_{CP}$ of connection portion 14A.

As can be seen in FIG. 2A, a cross-section shape of extension 16A can include an ellipse, and in this non-limiting example a circle. As provided here, the cross-section shape of extension 16A is taken along a plane that is perpendicular to centerline axis $C_{LE}$ of extension 16A. Height $H_E$ is a height of extension 16A measured between a major face of body 12A that is connected to connection portion 14A and an end of extension 16A that is on an opposite or distal end of extension 16A from connection portion 14A. Width $W_E$ is a width of extension 16A that is measured in a direction perpendicular to the measurement of height $H_E$ of extension 16A. Width $W_{CP}$ is a width of connection portion 14A that is measured perpendicular to the centerline axis passing through the center of extension 16A.

As can be seen in FIG. 2A, a cross-section shape of channel 18A can include an ellipse, and in this non-limiting example a circle. As provided here, the cross-section shape of channel 18A is taken along a plane that is perpendicular to centerline axis $C_{LC}$ of channel 18A. Centerline axis $C_{LC}$ of channel 18A is an imaginary major axis extending through a center of channel 18A. In this view, centerline axis $C_{LC}$ extends directly into and out of the page. Also with this view, centerline axis $C_{LE}$ of extension 16A extends directly into and out of the page. Wax pattern 24A is an assembly of pieces of wax comprising first and second wax pieces 26A and 28A in this embodiment. First wax piece 26A and second wax piece 28A are soluble wax core pieces. Slip area 30A is a portion of extension 16A that represents a portion of the final part that will be machined away (e.g., removed) from the final part.

In this non-limiting embodiment, centerline axis $C_{LC}$ of channel 18A is coaxial and parallel with centerline axis $C_{LE}$ of extension 16A. As shown in FIG. 2A, width $W_{CP}$ of connection portion 14A is greater than half of height $H_E$ of extension 16A. Also in this embodiment, width $W_E$ of extension 16A is equal to or greater than height $H_E$ of extension 16A. First wax piece 26A is disposed in channel 18A. Second wax piece 28A is disposed external to extension 16A and in contact with both extension 16A and body 12A. Slip area 30A is disposed on a distal end of extension 16A away from body 12A. In the view shown in FIG. 2A, slip area 30A is positioned at a top portion of extension 16A.

Wax pattern 24A, with first wax piece 26A and second wax piece 28A, is used during the casting process by melting to create the voids in which the metal cast material is poured into. As such, wax pattern 24A is representative of the formed portions of the final cast part. Slip area 30A represents a portion of extension 16A that is to be machined away during the casting process. In this way, slip area 30A creates an opening in the formed final part (e.g., in the surface of the airfoil).

As mentioned above, the circular shape of extension 16A of body 10 provides greater stability as a core feature to prevent breakage of core element 10A during setup and execution of the casting process. Here, with width $W_{CP}$ of connection portion 14A being greater than half of height $H_E$ of extension 16A, extension 16A and connection portion 14A provides a very strong and durable attachment to body 12A such that extension 16A is not easily broken or damaged during preparation for or during the casting process.

Figure 2B:
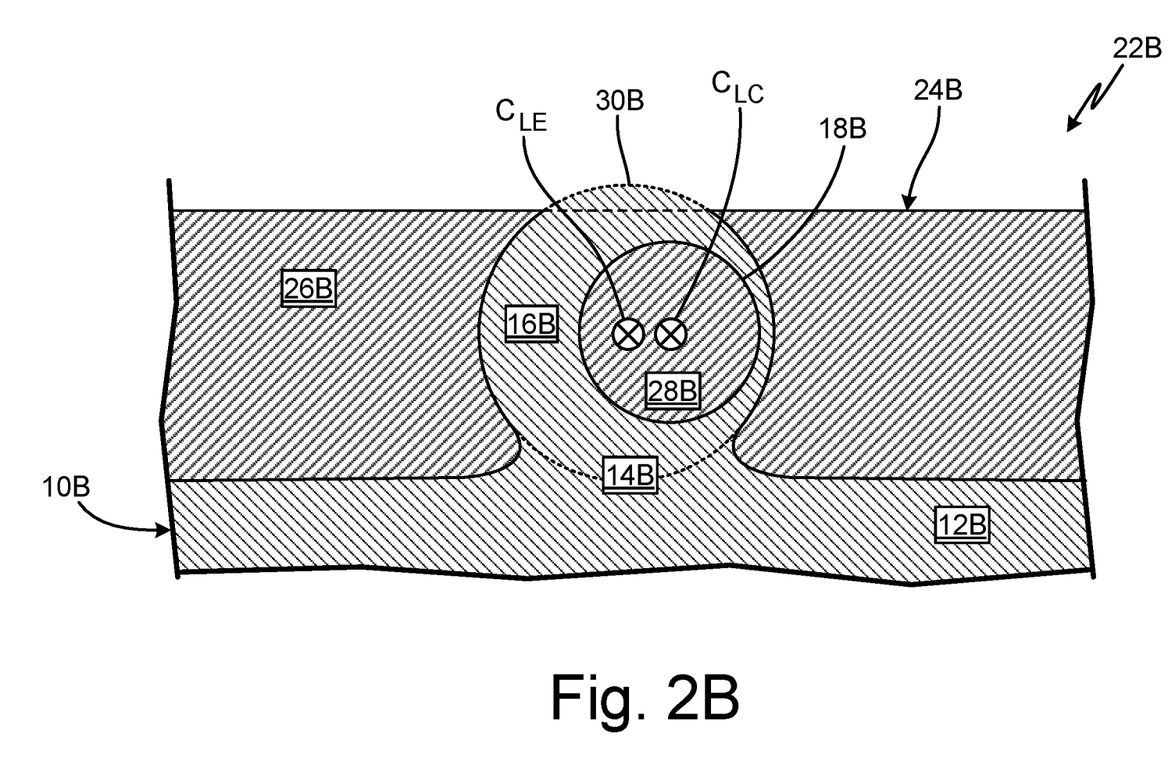
FIG. 2B is a side, cross-section view of a second core element and a second wax pattern.

FIG. 2B is a side, cross-section view of core assembly 22B that shows core element 10B (with body 12B, connection portion 14B, extension 16B, centerline axis $C_{LE}$ of extension 16B, channel 18B, and centerline axis $C_{LC}$ of channel 18B) and wax pattern 24B (with first wax piece 26B, second wax piece 28B, and slip area 30B).

As shown in FIG. 2B, centerline axis $C_{LC}$ of channel 18B is horizontally offset from centerline axis $C_{LE}$ of extension 16B. In other non-limiting embodiments, centerline axis $C_{LC}$ of channel 18B can be vertically, or a combination of horizontally and vertically, offset from centerline axis $C_{LE}$ of extension 16B. As will be discussed with respect to FIG. 4B, the offset positioning of channel 18B as shown in FIG. 2B provides an alternate discharge pattern and rate of discharge of a cooling fluid that is discharged from the cooling hole created by extension 16B.

Figure 2C:
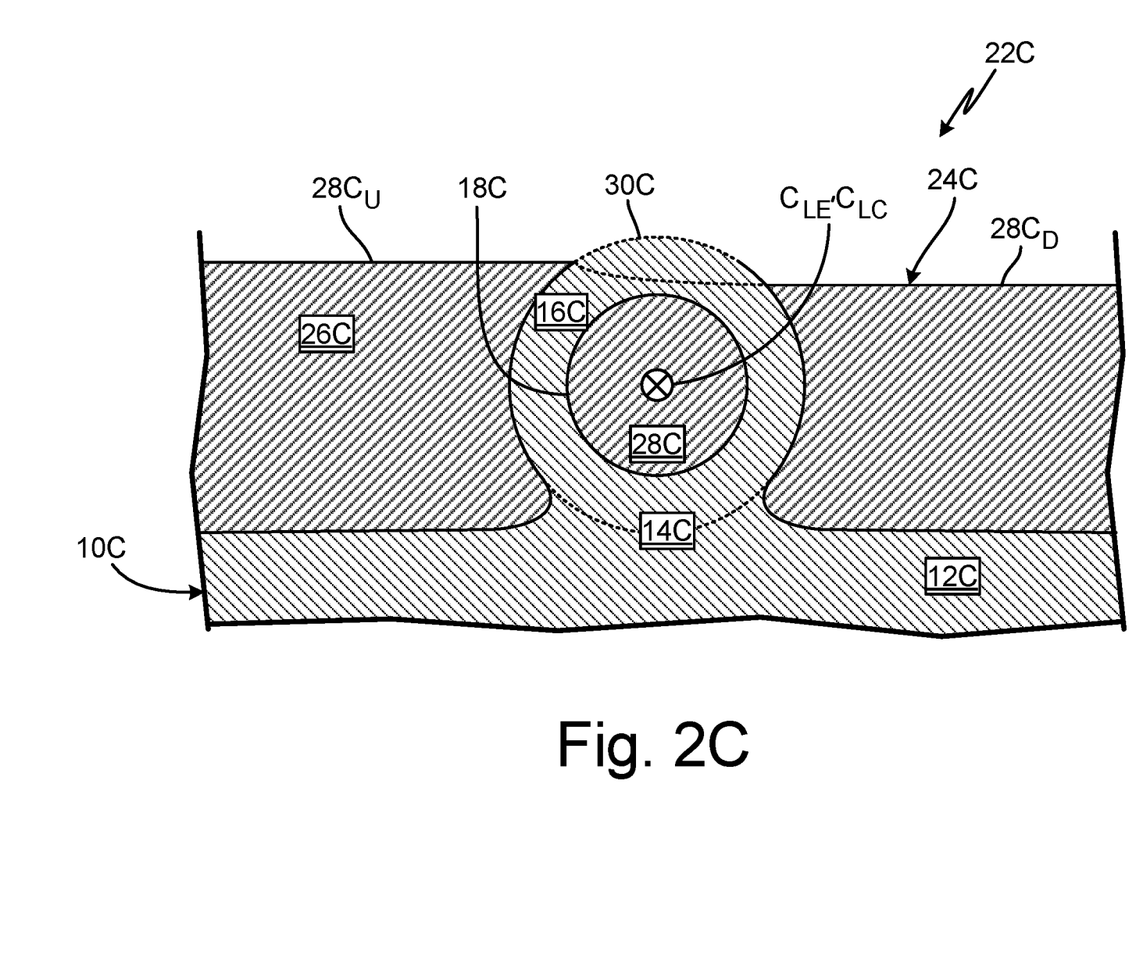
FIG. 2C is a side, cross-section view of a third core element and a third wax pattern.

FIG. 2C is a side, cross-section view of core assembly 22C that shows core element 10C (with body 12C, connection portion 14C, extension 16C, centerline axis $C_{LE}$ of extension 16C, channel 18C, and centerline axis $C_{LC}$ of channel 18C) and wax pattern 24C (with first wax piece 26C, second wax piece 28C, and slip area 30C). Second wax piece 28C is shown to include upstream portion $28C_U$ and downstream portion $28C_D$ of second wax piece 28C. As shown in FIG. 2C, the left side of the figure represents an upstream direction and the right side represents a downstream direction, with the upstream/downstream terms relating to the eventual in-use directions of the final cast part (e.g., airfoil).

Here, an upper surface of upstream portion $28C_U$ of second wax piece 28C is shown as being at a different, higher level than an upper face of downstream portion $28C_D$ of second wax piece 28C. The height difference between upstream portion $28C_U$ and downstream portion $28C_D$ of second wax piece 28C allows for variations in fluid flow discharge from a cooling hole that is to be formed from extension 16C in the final cast part (see e.g., FIG. 4C and related discussion). By varying the difference in height between upstream portion $28C_U$ and downstream portion $28C_D$ of second wax piece 28C, the flow of cooling air can be directed and tuned as needed due to operational parameters.

Figure 3A:
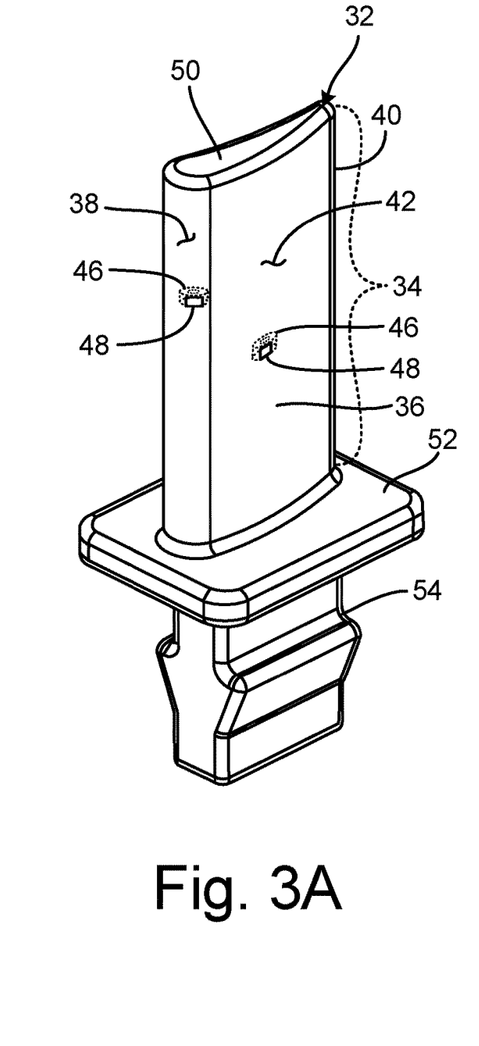
FIG. 3A is a perspective view of an airfoil with cooling holes.
Figure 3B:
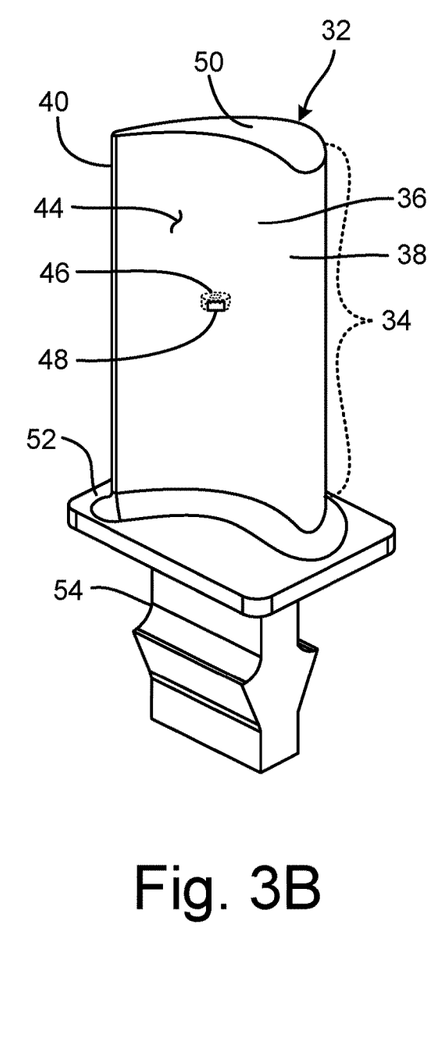
FIG. 3B is another perspective view of the airfoil with another cooling hole.

FIG. 3A is a perspective view of airfoil 32 and shows body 34, exterior surface 36, leading edge 38, trailing edge 40, suction side 42, cooling holes 46, outlets 48, tip 50, platform 52, and root 54. FIG. 3B is another perspective view of airfoil 32 showing body 34, exterior surface 36, leading edge 38, trailing edge 40, pressure side 44, cooling hole 46, outlet 48, tip 50, platform 52, and root 54.

Airfoil 32 is a stator or rotor vane or blade for use in a jet turbine engine. Body 34 is a main portion of airfoil 32. Exterior surface 36 is an outside part or outermost layer of body 34. Leading edge 38 is an edge of airfoil 32 that is pointed in a generally upstream direction during use of airfoil 32. Trailing edge 40 is an edge of airfoil 32 that is pointed in a generally downstream direction during use of airfoil 32. Suction side 42 is a curved side of airfoil 32 that is positioned opposite from pressure side 44. Pressure side 44 is a curved side of airfoil 32 that is positioned opposite from suction side 42. Cooling holes 46 are slots or holes disposed in exterior surface 36 of airfoil 32. In the non-limiting embodiments presented in FIGS. 3A and 3B, airfoil 32 includes three cooling holes 46. Outlets 48 are openings or holes. Tip 50 is a distal end of airfoil 32. Platform 52 is a generally planar piece of solid material. Root 54 is a bottom base portion of airfoil 32.

Airfoil 32 connects to a ring or a hub (not shown) of a jet turbine engine via the bottom root portion of airfoil 32. Body 34 includes leading edge 38, suction side 42, and pressure side 44. Exterior surface 36 is disposed around an exterior of body 34. Leading edge 38 connects to and extends between suction side 42 and pressure side 44. Trailing edge 40 connects to and extends between suction side 42 and pressure side 44 on an opposite end of body 34 from leading edge 38. Suction side 42 wraps around a side of airfoil 32 and connects to leading edge 38 at an upstream portion of airfoil 32 and to pressure side 44 at a downstream portion of leading edge 32. Pressure side 44 wraps around an opposite side of airfoil 32 and connects to leading edge 38 at an upstream portion of airfoil 32 and to suction side 42 at a downstream portion of leading edge 32. Cooling holes 46 are disposed in body 34 and create a fluidic passage through exterior surface 36. As will be discussed with respect to FIGS. 4A-4C, cooling holes 46 are fluidly connected to a cooling circuit positioned inside of body 34. Outlets 48 are disposed in exterior surface 36 and are fluidly connected to cooling holes 46. Tip 50 is connected to a distal end of body 34 of airfoil 32. Platform 52 is disposed between body 34 and root 54. Root 54 is connected to platform 52.

Airfoil 32 creates an aerodynamic force resulting from air passing over airfoil 32. Body 34 connects leading edge 38, suction side 42, and pressure side 44 together. Exterior surface 36 provides a solid barrier of body 34 that deflects air from exterior surface 36 during use of airfoil 32. During use of airfoil 32, leading edge 38 comes into contact with and redirects air around suction and pressure sides 40A and 40B of airfoil 32. The convex and concave contours of suction side 42 and pressure side 44 create a pressure gradient between the air flowing across suction and pressure sides 40A and 40B. Cooling holes 46 deliver cooling air from body 34 to exterior surface 36 such that the cooling air absorbs thermal energy from body 34 as the cooling air flows across exterior surface 36 of airfoil 32.

Figure 4A:
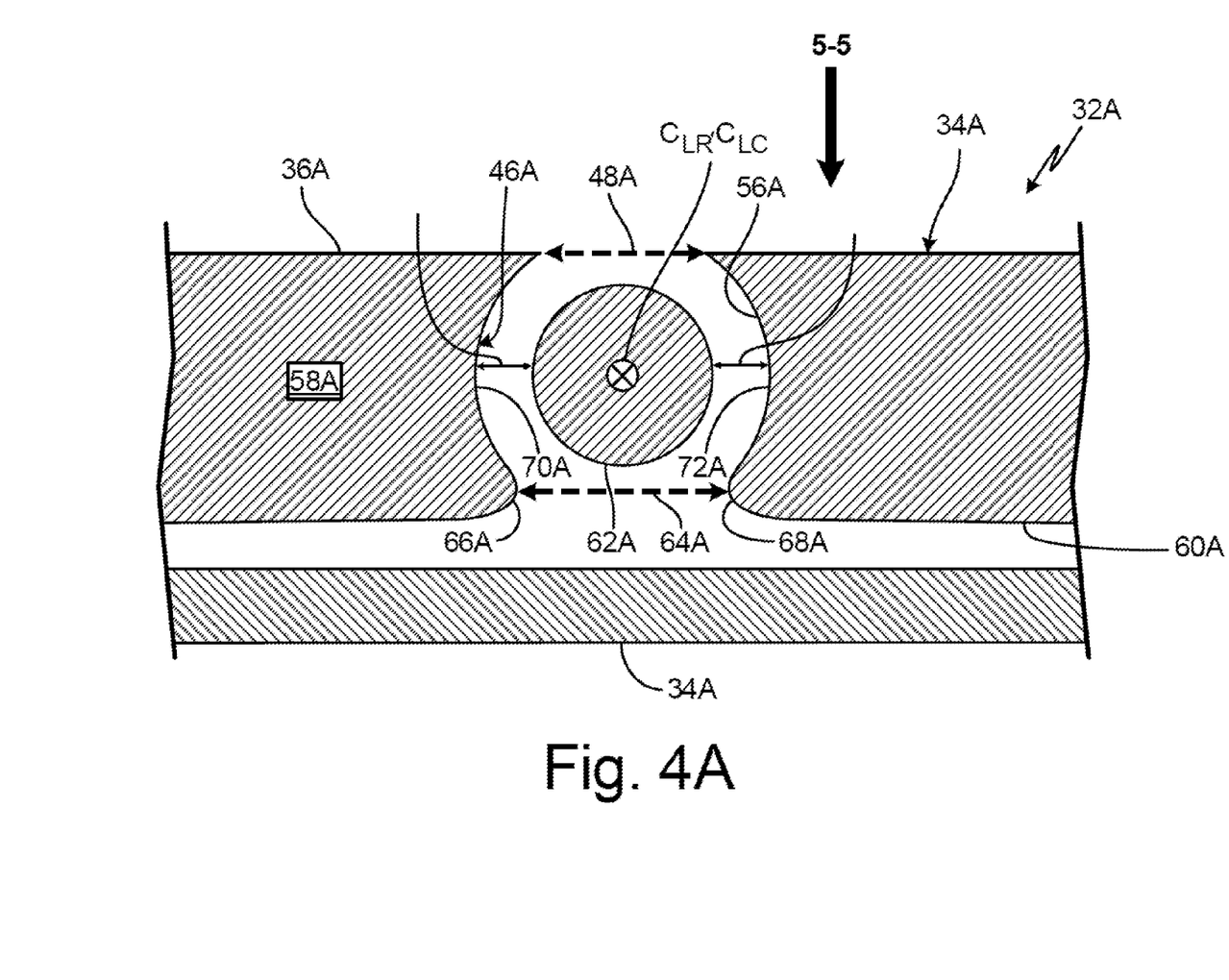
FIG. 4A is a side, cross-section view of a first airfoil with a first cooling hole.

FIG. 4A is a side, cross-section view of airfoil 32A and shows body 34A, exterior surface 36A, cooling hole 46A, wall 58A, cooling circuit 60A, cavity 56A, centerline axis $C_{LC}$ of cavity 56A, outlet 48A, rod 62A, centerline axis $C_{LR}$ of rod 62A, inlet 64A, first cusp 66A, second cusp 68A, first sidewall 70A, first channel 71A, second sidewall 72A, and second channel 73A.

Cooling hole 46A of FIG. 4A has been formed by core element 10A of FIG. 2A by investment casting in which metal replaces wax, and subsequently the ceramic is removed to form cooling hole 46A and cooling circuit 60A. Cooling hole 46A corresponds to extension 16A shown in FIG. 2A and includes cavity 56A, outlet 48A, and rod 62A. Airfoil 32A can include more than one cooling hole 46A. Wall 58A corresponds to second wax piece 28A shown in FIG. 2A and includes a generally flat, planar piece of solid material. Cooling circuit 60A corresponds to body 12A shown in FIG. 2A and includes an assembly of fluidic channels and cavities. Cavity 56A corresponds to extension 16A shown in FIG. 2A and includes a chamber. As shown in FIG. 2A, a cross-section shape of cavity 56A generally includes an ellipse, and in particular a circle. A shape of cavity 56A generally includes a tube.

Centerline axis $C_{LC}$ is an imaginary major axis extending through a center of cavity 56A. In this view, centerline axis $C_{LC}$ extends directly into and out of the page. Outlet 48A corresponds to an interface between extension 16A and slip area 30A shown in FIG. 2A and includes an opening or hole. Rod 62A corresponds to channel 18A shown in FIG. 2A and includes a cylindrically shaped piece of solid material. As shown in FIG. 2A, a cross-section shape of rod 62A generally includes an ellipse, and in particular a circle. Centerline axis $C_{LR}$ is an imaginary major axis extending through a center of rod 62A. In this view, centerline axis $C_{LR}$ of rod 62A extends directly into and out of the page.

Inlet 64A is a fluidic opening extending between first cusp 66A and second cusp 68A. First cusp 66A and second cusp 68A are curved corners. First cusp 66A is formed at a location where first sidewall 70A meets cooling circuit 60A. Second cusp 68A is formed at a location where second sidewall 72A meets cooling circuit 60A. First sidewall 70A and second sidewall 72A are arcuate or curved sidewalls of cavity 56A. First channel 71A and second channel 73A are fluidic passages or channels disposed in and extending through body 34A. Cooling hole 46A is disposed in a portion of exterior surface 36A and is fluidly connected to cooling circuit 60A. Cooling hole 46A can be disposed on or in any of leading edge 38, suction side 42, and/or pressure side 44 of airfoil 32 (as shown in FIGS. 3A and 3B). Wall 58A is positioned on both sides of cooling hole 46A and extends between exterior surface 36A and cooling circuit 60A. Cooling circuit 60A is disposed in an interior portion of airfoil 32A and is fluidly connected to cavity 56A. Cavity 56A is disposed in body 34A and is fluidly connected to cooling circuit 60A and to outlet 48A. In this non-limiting embodiment, centerline axis $C_{LC}$ of cavity 56A is parallel to and coaxial with centerline axis $C_{LR}$ of rod 62A. Outlet 48A is disposed in a portion of exterior surface 36A of wall 58A. Outlet 48A fluidly connects cavity 56A to exterior surface 36A of body 34A. Rod 62A is disposed in and passes through a portion of cavity 56A.

Inlet 64A extends between first cusp 66A and second cusp 68A and forms a fluidic connection point between cooling circuit 60A and cavity 56A. First cusp 66A is located on an upstream (to the left in FIG. 4A) end of inlet 64A and second cusp 68A is located on a downstream (to the right in FIG. 4A) side of inlet 64A. The curvatures of first sidewall 70A and second sidewall 72A create a bulbous, generally circular shape of cavity 56A. As can be seen in FIG. 4A, cavity 56A branches at inlet 64A into first channel 71A and second channel 73A, which recombine at outlet 48A. First channel 71A is formed between first sidewall 70A and a first side of rod 62A. Second channel 73A is formed between second sidewall 72A and a second side of rod 62A that is opposite from the first side of rod 62A. In this example, both of first channel 71A and second channel 73A fluidly connect to and extend between cooling circuit 60A and outlet 48A. Also in this example, first channel 71A is fluidly connected to second channel 73A at cooling circuit 60A and at outlet 48A.

An investment casting process to produce or form airfoil 32A, using core element 10A, can be the following. Core element 10A, having the geometry desired for cooling circuit 60A, is placed in a metal die whose walls surround but are generally spaced away from core element 10A. The die is filled with a disposable pattern material such as wax pattern 24A. The die is removed leaving core element 10A embedded in wax pattern 24A. The outer shell mold is then formed about wax pattern 24A by dipping wax pattern 24A in a ceramic slurry and then applying larger, dry ceramic particles to the slurry. This process is termed stuccoing. The stuccoed wax pattern 24A, containing core element 10A, is then dried and the stuccoing process repeated to provide the desired shell mold wall thickness. At this point the mold is thoroughly dried and heated to an elevated temperature to remove wax pattern 24A and strengthen the ceramic material of core element 10A.

The result is a ceramic mold containing core element 10A which in combination define a mold cavity. It will be understood that the exterior of core element 10A defines the passageway to be formed in the casting and the interior of the shell mold defines the external dimensions of the casting, or airfoil 32 to be made. Core element 10A and shell may also define casting portions such as gates and risers which are necessary for the casting process but are not a part of the finished cast component. After the removal of wax pattern 24A and thermally sintering the refractory ceramic shell mold, molten material (e.g., superalloy) is poured into the cavity defined by the shell mold and core element 10A and is solidified. The mold and core element 10A are then removed from the casting by a combination of mechanical and chemical means.

In following this casting process, first wax piece 26A is removed during the casting process and is replaced by wall 58A of airfoil 32 while second wax piece 28A is removed and replaced with rod 62A. Also during the casting process, body 12A is removed and replaced with cooling circuit 60A and extension 16A is removed and replaced with cavity 56A. Similar removing and replacing occurs with respect to the embodiments shown and is discussed with respect to FIGS. 2B and 4B, as well as FIGS. 2C and 4C.

Cooling circuit 60A provides and delivers a source of cooling air to cooling hole 46A. Cooling air travels through cooling circuit 60A, is delivered to cavity 56A through inlet 64A, travels around both sides of rod 62A along first sidewall 70A and second sidewall 72A, is pushed out of outlet 48A, and is then delivered to exterior surface 36A of airfoil 32A. In this example, with centerline axis $C_{LC}$ of cavity 56A being coaxial with centerline axis $C_{LR}$ of rod 62A, a flow of cooling air that flows around rod 62A is evenly distributed around the two sides of rod 62A and provides a first cooling air flow distribution pattern out of outlet 48A and along exterior surface 36A.

The configuration of airfoil 32A with cooling hole 46A is fundamentally different from existing configurations of a machined hole in that the cooling air can approach outlet 48A from two directions (e.g., around both sides of rod 62A) instead of from just a single direction. In an example with airfoil 32A spinning, the spinning energy of airfoil 32A will direct the cooling air to exit cooling hole 46A in an intended direction. The configuration of cooling hole 46A is also useful on leading edge 38 of airfoil 32A, such as where "showerheads" of film cooling holes are currently used in existing designs, due to the variations and tuning of how the cooling air is directed out of cooling hole 46A. The configuration shown in FIG. 4A (and in FIGS. 4B and 4C) additionally limits back-flow of the cooling air in the opposing direction rather than choking in a narrow opening such as can occur in existing single-passage drilled cooling hole designs.

Figure 4B:
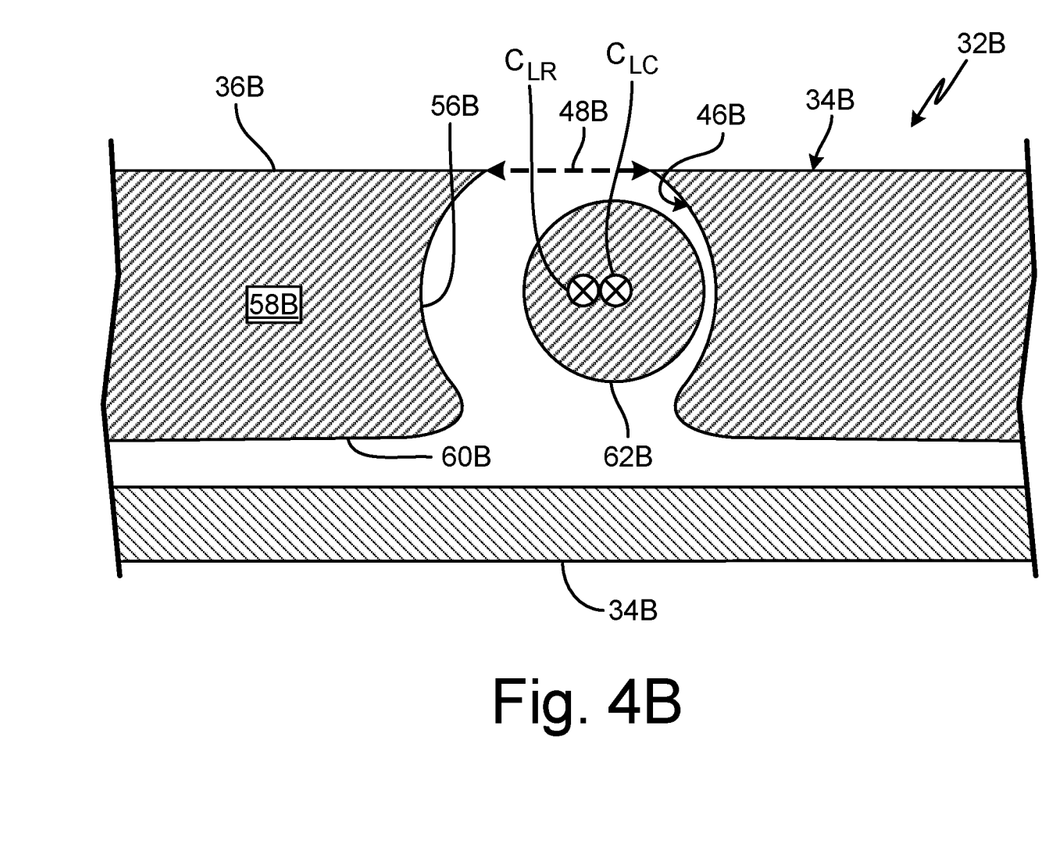
FIG. 4B is a side, cross-section view of a second airfoil with a second cooling hole.

FIG. 4B is a side, cross-section view of airfoil 32B and shows body 34B, exterior surface 36B, cooling hole 46B, wall 58B, cooling circuit 60B, cavity 56B, centerline axis $C_{LC}$ of cavity 56B, outlet 48B, rod 62B, and centerline axis $C_{LR}$ of rod 62B.

Cooling hole 46B of FIG. 4B has been formed by core element 10B of FIG. 2B by investment casting in which metal replaces wax, and subsequently the ceramic is removed to form cooling hole 46B and cooling circuit 60B. In this embodiment, cooling hole 46B corresponds to extension 16B, wall 58B corresponds to second wax piece 28B, cooling circuit 60B corresponds to body 12B, cavity 56B corresponds to extension 16B, outlet 48B corresponds to an interface between extension 16B and slip area 30B, and rod 62B corresponds to channel 18B each of which are shown in FIG. 2B. As shown in FIG. 4B, centerline axis $C_{LR}$ of rod 62B is offset from centerline axis $C_{LC}$ of cavity 56B. Additionally, centerline axis $C_{LR}$ of rod 62B is parallel to centerline axis $C_{LC}$ of cavity 56B. In this non-limiting embodiment, centerline axis $C_{LR}$ of rod 62B is horizontally offset from centerline axis $C_{LC}$ of cavity 56B. In other non-limiting embodiments, centerline axis $C_{LR}$ of rod 62B can be vertically, or a combination of horizontally and vertically, offset from centerline axis $C_{LC}$ of cavity 56B.

With centerline axis $C_{LR}$ of rod 62B being offset from centerline axis $C_{LC}$ of cavity 56B, the flow of cooling air that flows around rod 62B can be unevenly distributed around the two sides of rod 62B to provide a second cooling air flow distribution pattern out of outlet 48B and along exterior surface 36B. Depending on the operational parameters, the amount of flow on both sides of rod 62B can be controlled and tuned by placement of rod 62B to control the net flow of cooling air and the second cooling air flow distribution pattern out of outlet 48B. For example, an offset centerline axis $C_{LR}$ of rod 62B can be used in a situation where airfoil 32B is not spinning or is static (e.g., in the instance of airfoil 32B being a stator blade or vane).

Figure 4C:
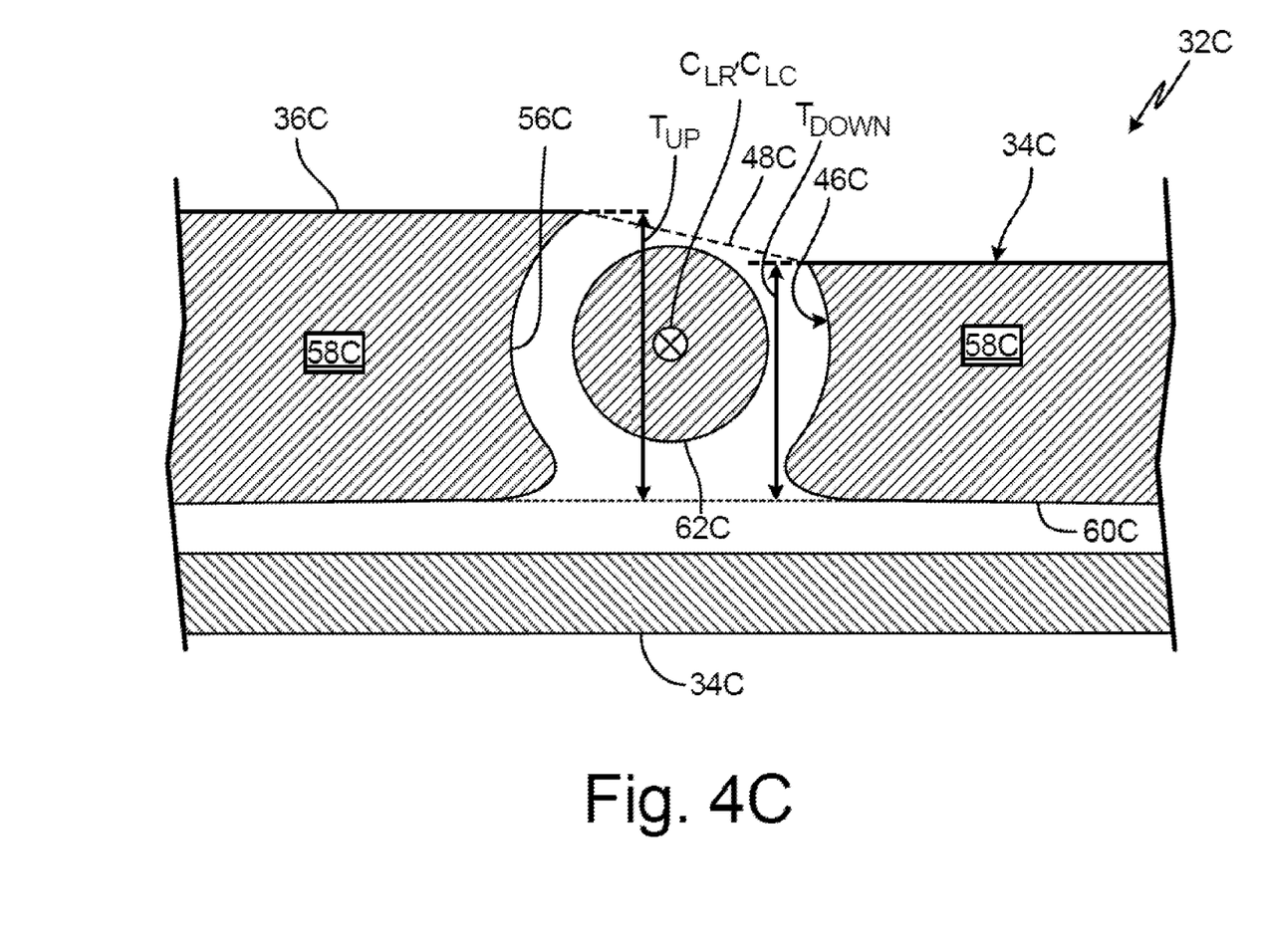
FIG. 4C is a side, cross-section view of a third airfoil with a third cooling hole.

FIG. 4C is a side, cross-section view of airfoil 32C and shows body 34C, exterior surface 36C, cooling hole 46C, wall 58C (with upstream thickness $T_{UP}$ and downstream thickness $T_{DOWN}$), cooling circuit 60C, cavity 56C, centerline axis $C_{LC}$ of cavity 56C, outlet 48C, rod 62C, and centerline axis $C_{LR}$ of rod 62C.

Cooling hole 46C of FIG. 4C has been formed by core element 10C of FIG. 2C by investment casting in which metal replaces wax, and subsequently the ceramic is removed to form cooling hole 46C and cooling circuit 60C. In this embodiment, cooling hole 46C corresponds to extension 16B, wall 58C corresponds to second wax piece 28C, cooling circuit 60C corresponds to body 12C, cavity 56C corresponds to extension 16C, outlet 48C corresponds to an interface between extension 16C and slip area 30C, and rod 62C corresponds to channel 18C each of which are shown in FIG. 2C. Upstream thickness $T_{UP}$ is a thickness of a portion of wall 58C located upstream (to the left in FIG. 4C) of outlet 48C, as measured vertically and as shown in FIG. 4C. Downstream thickness $T_{DOWN}$ is a thickness of a portion of wall 58C located downstream (to the right in FIG. 4C) of outlet 48C, as measured vertically and as shown in FIG. 4C.

As shown in FIG. 4C, exterior surface 36C undulates at a location of cooling hole 46C in a direction from upstream of cooling hole 46C (to the left in FIG. 4C) to downstream of cooling hole 46C (to the right in FIG. 4C) such that the thickness of wall 58C changes from upstream thickness $T_{UP}$ to downstream thickness $T_{DOWN}$ at a location of outlet 48C. In this example, upstream thickness $T_{UP}$ is greater than downstream thickness $T_{DOWN}$ relative to a downstream direction of airflow across airfoil 32C. In other non-limiting embodiments, upstream thickness $T_{UP}$ can be equal to or greater than downstream thickness $T_{DOWN}$ in a downstream direction, or in another direction not parallel to a downstream direction. The configuration of cooling holes 46C as shown in FIG. 4C provides for further tuning and directional control of the flow of cooling air out of outlet 48C onto exterior surface 36C.

Figure 4D:
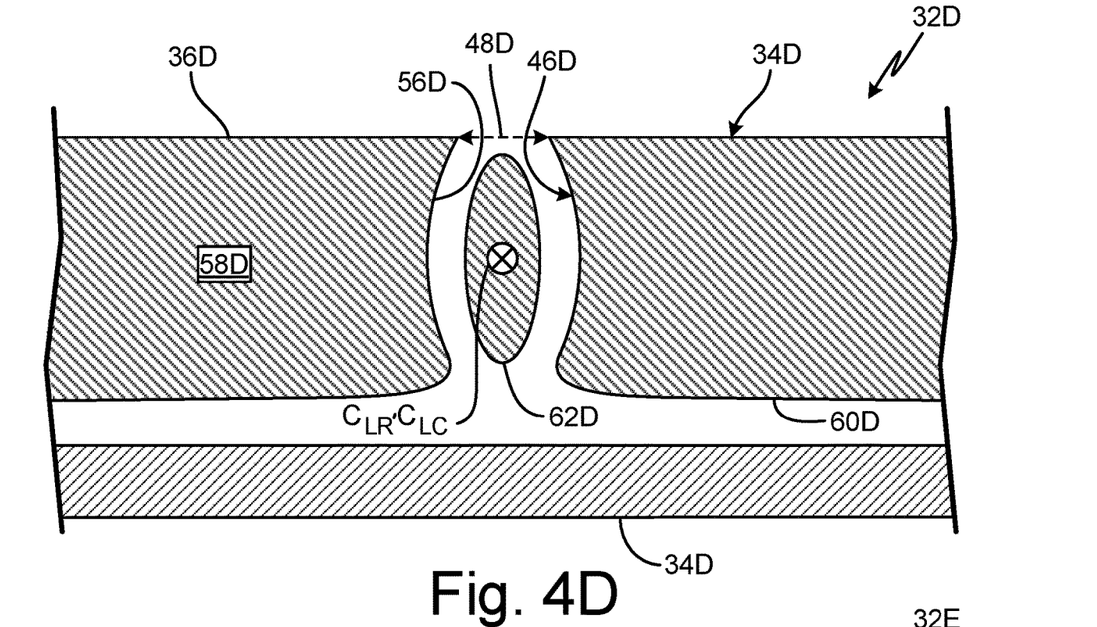
FIG. 4D is a side, cross-section view of a fourth airfoil with a fourth cooling hole.

FIG. 4D is a side, cross-section view of airfoil 32D and shows body 34D, exterior surface 36D, cooling hole 46D, wall 58D, cooling circuit 60D, cavity 56D, centerline axis $C_{LC}$ of cavity 56D, outlet 48D, rod 62D, and centerline axis $C_{LR}$ of rod 62D.

In this embodiment, a cross section shape of cavity 56D taken along a plane perpendicular to centerline axis $C_{LC}$ of cavity 56D includes an ellipse with an eccentricity greater than zero. Also in this embodiment, a cross section shape of rod 62E taken along a plane perpendicular to centerline axis $C_{LR}$ of rod 62D includes an ellipse with an eccentricity greater than zero. For example, an elongated portion of rod 62D extends in a vertical direction, with the horizontal width of rod 62D being less than the vertical height of rod 62D. Likewise, an elongated portion of cavity 56D extends in a vertical direction, with the horizontal width of cavity 56D being less than the vertical height of cavity 56D. In other non-limiting embodiments, the cross section shapes of cavity 56D and/or of rod 62 can include non-elliptical shapes.

Here, centerline axis $C_{LC}$ of cavity 56D is shown as being parallel to and coaxial with centerline axis $C_{LR}$ of rod 62D. In other non-limiting embodiments, centerline axis $C_{LR}$ of rod 62D can be offset vertically and/or horizontally from centerline axis $C_{LC}$ of cavity 56D. The configuration of cooling hole 46D with elongated cavity 56D and rod 62D allow for further variation and tuning of the flow of cooling air through cavity 56D, out of outlet 48D, and onto exterior surface 36D.

Figure 4E:
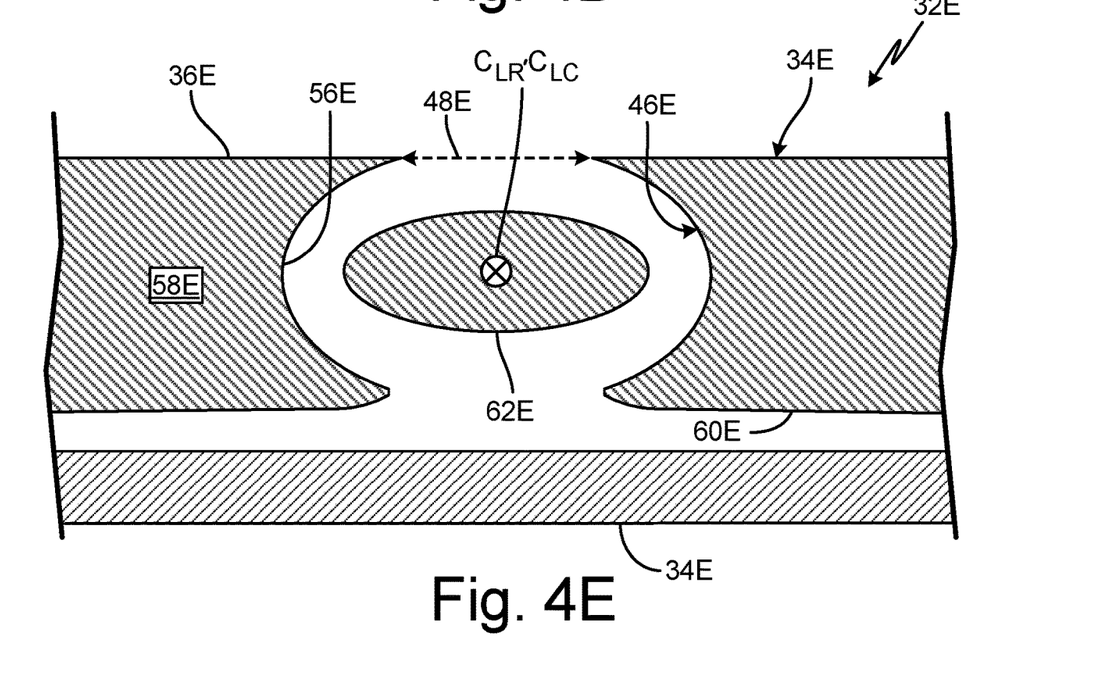
FIG. 4E is a side, cross-section view of a fifth airfoil with a fifth cooling hole.

FIG. 4E a side, cross-section view of airfoil 32E and shows body 34E, exterior surface 36E, cooling hole 46E, wall 58E, cooling circuit 60E, cavity 56E, centerline axis $C_{LC}$ of cavity 56E, outlet 48E, rod 62E, and centerline axis $C_{LR}$ of rod 62E.

Similar to the embodiment shown in FIG. 4D, a cross section shape of cavity 56E taken along a plane perpendicular to centerline axis $C_{LC}$ of cavity 56E includes an ellipse with an eccentricity greater than zero. Also in this embodiment, a cross section shape of rod 62E taken along a plane perpendicular to centerline axis $C_{LR}$ of rod 62E includes an ellipse with an eccentricity greater than zero. However, in comparison to cooling hole 46D shown in FIG. 4D, FIG. 4E shows an elongated portion of rod 62E extending in a horizontal direction, with the horizontal width of rod 62E being greater than the vertical height of rod 62E. Likewise, an elongated portion of cavity 56E extends in a horizontal direction, with the horizontal width of cavity 56E being greater than the vertical height of cavity 56E.

The elongated configurations of cavities 48D and 48E, as well as of rods 52D and 52E allow for further tuning and control of the cooling air output from cooling holes 46D and 42E, respectfully.

Figure 5:
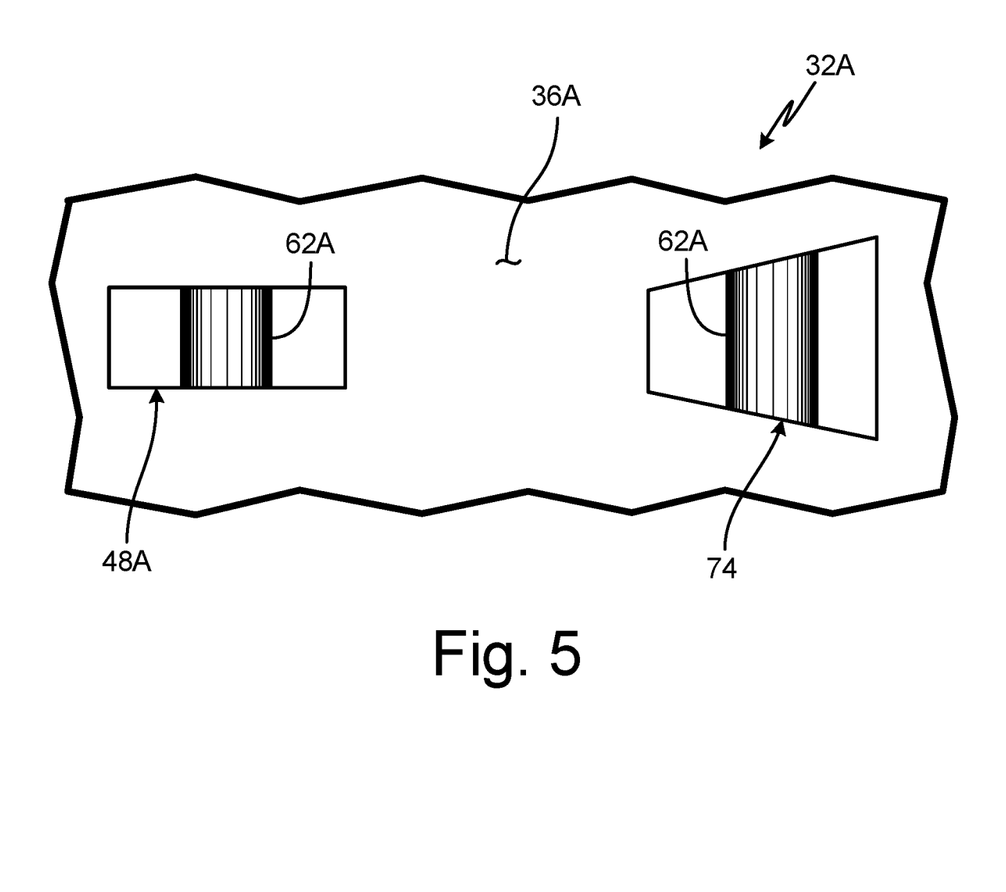
FIG. 5 is a top view taken from 5-5 shown in FIG. 4A of a portion of an exterior surface of the airfoil with two cooling hole outlets.

FIG. 5 is a top view taken from 5-5 shown in FIG. 4A of a portion of exterior surface 36A of airfoil 32A with first outlet 48A, rods 62A, and second outlet 74. In the view shown in FIG. 5, an upstream direction is to the left of the figure and a downstream direction is to the right of the figure. First outlet 48A is a rectangular shaped hole or passage extending into exterior surface 36A of airfoil 32A. Second outlet 74 is a flared hole or passage extending into exterior surface 36A of airfoil 32A. In this example, a shape of second outlet 74 includes an isosceles trapezoid. In other non-limiting embodiments, the shape of second outlet 74 can include other types of trapezoids such as acute, right, obtuse, parallelogram, rhombus, or square. Second outlet 74 can also include an ellipse, a circle, a semi-circle, a triangle, a rhombus, a polygon, or another geometric shape.

The variation in shape of flared second outlet 74 provides for a diffused exit pattern of cooling air from second outlet 74. This variation in exit pattern can also include slowing down or speeding up a velocity of the cooling air as the cooling air exits second outlet 74 so as to adjust the cooling effects of the cooling flow as needed based upon operational parameters.

Discussion of Possible Embodiments

The following are non-exclusive descriptions of possible embodiments of the present invention.

A core element includes a body, an extension connected to and protruding from the body, and a connection portion connected to the body and to the extension. A shape of the extension comprises a tube with a centerline axis passing through a center of the extension. A shape of a cross-section of the extension taken along a plane perpendicular to the extension centerline axis comprises an ellipse. The extension is connected to the body by the connection portion. The core element is configured as an investment core for use in a casting process used to produce an airfoil.

The core element of the preceding paragraph can optionally include, additionally and/or alternatively, any one or more of the following features, configurations and/or additional components.

The shape of the cross-section of the extension can comprise a circle.

A channel can be disposed through the extension, wherein the channel can comprise a centerline axis passing through a center of the channel, wherein a shape of a cross-section of the channel taken along a plane perpendicular to the channel centerline axis can comprise an ellipse.

The shape of the cross-section of the channel can comprise a circle.

The centerline axis of the channel can be coaxial with the centerline axis of the extension.

The centerline axis of the channel can be offset from the centerline axis of the extension.

The centerline axis of the channel can be parallel to the centerline axis of the extension.

A width of the connection portion can be greater than half of a height of the extension, wherein the width of the connection portion can be measured perpendicular to the centerline axis passing through the center of the extension, and/or wherein the height of the extension can be measured between a major face of the body that can be connected to the connection portion and an end of the extension that can be on an opposite end of the extension from the connection portion.

A width of the extension can be equal to or greater than the height of the extension, wherein the width of the extension can be measured in a direction parallel to the measurement of the extension height.

An airfoil includes a body, an airfoil wall, a cooling circuit, and a cooling hole. The airfoil wall forms an exterior surface of the body. The cooling circuit is disposed within the body. The cooling hole disposed in a portion of the body. The cooling hole fluidly connects the cooling circuit to the exterior surface of the airfoil wall. The cooling hole includes a cavity, an inlet, an outlet, and a rod of solid material. The cavity is disposed in a portion of the airfoil wall. The cavity includes a tubular shape with a centerline axis passing through a center of the cavity. A cross-section shape of the cavity taken along a plane perpendicular to the cavity centerline comprises an ellipse. The inlet fluidly connects the cooling circuit to the cavity. The outlet fluidly connects the cavity to the exterior surface of the body and is disposed in a portion of the exterior surface of the airfoil wall. The rod of solid material is disposed in the cavity and passes through a portion of the cavity.

The airfoil of the preceding paragraph can optionally include, additionally and/or alternatively, any one or more of the following features, configurations and/or additional components.

The exterior surface can undulate at a location of the cooling hole in a direction from upstream of the cooling hole to downstream of the cooling hole such that a thickness of the airfoil wall can change at a location of the outlet of the cooling hole.

A shape of the outlet can include a flared portion.

The shape of the cross-section of the cavity can comprise a circle.

A centerline axis of the rod can be parallel to the centerline axis of the cavity.

The centerline axis of the rod can be coaxial with the centerline axis of the cavity.

A shape of a cross-section of the rod can comprise an ellipse.

A core assembly for use with an investment casting process includes a core element and a wax pattern. The core element includes a body, an extension connected to and protruding from the body, a channel disposed through the extension, and a connection portion connected to the body and to the extension. The extension is connected to the body by the connection portion. A shape of the extension includes a tube with a centerline axis passing through a center of the extension. A shape of a cross-section of the extension taken along a plane perpendicular to the extension centerline axis includes an ellipse. The channel includes a centerline axis passing through a center of the channel. A shape of a cross-section of the channel taken along a plane perpendicular to the channel centerline axis includes an ellipse.

The wax pattern first piece can comprise a rod of wax.

A method of making an airfoil includes forming a core assembly and creating an airfoil with the core assembly through investment casting. The core assembly includes a core element and a wax pattern. The core element includes a body, an extension connected to and protruding from the body, a channel disposed through the extension, and a connection portion connected to the body and to the extension. The extension is connected to the body by the connection portion. A shape of the extension includes a tube with a centerline axis passing through a center of the extension. A shape of a cross-section of the extension taken along a plane perpendicular to the extension centerline axis includes an ellipse. The channel includes a centerline axis passing through a center of the channel. A shape of a cross-section of the channel taken along a plane perpendicular to the channel centerline axis includes an ellipse. The airfoil includes a body, an airfoil wall, a cooling circuit, and a cooling hole. The airfoil wall forms an exterior surface of the body. The cooling circuit is disposed within the body. The cooling hole disposed in a portion of the body. The cooling hole fluidly connects the cooling circuit to the exterior surface of the airfoil wall. The cooling hole includes a cavity, an outlet, and a rod of solid material. The cavity is disposed in a portion of the airfoil wall. The cavity includes a tubular shape with a centerline axis passing through a center of the cavity. A cross-section shape of the cavity taken along a plane perpendicular to the cavity centerline comprises an ellipse. The outlet fluidly connects the cavity to the exterior surface of the body and is disposed in a portion of the exterior surface of the airfoil wall. The rod of solid material is disposed in the cavity and passes through a portion of the cavity.

The method of the preceding paragraph can optionally include, additionally and/or alternatively, any one or more of the following steps, features, configurations and/or additional components.

The first piece of the wax pattern can be removed from the channel of the core element and/or the first piece of the wax pattern can be replaced with the rod, the second piece of the wax pattern can be removed and/or the second piece of the wax pattern can be replaced with the body of the airfoil, the extension of the core element can be removed to form the cavity of the cooling hole, and/or the body of the core element can be removed to form the airfoil cooling circuit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
    a body;
    an airfoil wall forming an exterior surface of the body;
    a cooling circuit disposed within the body; and
    a cooling hole disposed in the airfoil wall, wherein the cooling hole fluidly connects the cooling circuit to the exterior surface of the airfoil wall, the cooling hole comprising:
        a cavity disposed in a portion of the airfoil wall, wherein the cavity has a tubular shape with a centerline axis passing through a center of the cavity, wherein the cavity comprises;
            a first sidewall extending from the exterior surface of the airfoil wall to the cooling circuit;
            a second sidewall on an opposite side of the cavity from the first sidewall, wherein the second sidewall extends from the exterior surface of the airfoil wall to the cooling circuit;
            a first channel fluidly connected to the cooling circuit and formed partially by the first sidewall; and
            a second channel fluidly connected to the cooling circuit and partially formed by the second sidewall;
        an inlet fluidly connecting the cooling circuit to the cavity;
        an outlet disposed in a portion of the exterior surface of the airfoil wall, wherein the outlet fluidly connects the first and second channels of the cavity to the exterior surface of the body; and
        a rod of solid material disposed in the cavity and passing through a portion of the cavity, wherein the first channel is formed between the first sidewall and a first side of the rod, and wherein the second channel is formed between the second sidewall and a second side of the rod that is opposite from the first side of the rod.

2. The airfoil of claim 1, wherein the exterior surface undulates at a location of the cooling hole in a direction from upstream of the cooling hole to downstream of the cooling hole such that a thickness of the airfoil wall changes at a location of the outlet of the cooling hole wherein a thickness of the airfoil wall on an upstream side of the cooling hole is different than a thickness of the airfoil wall on a downstream side of the cooling hole.

3. The airfoil of claim 1, wherein a shape of the outlet includes a flared portion.

4. The airfoil of claim 1, wherein a cross-section shape of the cavity taken along a plane perpendicular to the cavity centerline forms an ellipse with an eccentricity greater than zero.

5. The airfoil of claim 1, wherein a centerline axis of the rod is parallel to the centerline axis of the cavity.

6. The airfoil of claim 1, wherein the centerline axis of the rod is coaxial with the centerline axis of the cavity.

7. The airfoil of claim 1, wherein a shape of a cross-section of the rod comprises an ellipse with an eccentricity greater than zero.

\* \* \* \* \*